US012105662B2

(12) United States Patent
Wu

(10) Patent No.: US 12,105,662 B2
(45) Date of Patent: *Oct. 1, 2024

(54) CHIP HAVING DUAL-MODE DEVICE THAT SWITCHES BETWEEN ROOT COMPLEX MODE AND ENDPOINT MODE IN DIFFERENT SYSTEM STAGES AND ASSOCIATED COMPUTER SYSTEM

(71) Applicant: MEDIATEK INC., Hsin-Chu (TW)

(72) Inventor: Ching-Yi Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,968

(22) Filed: Sep. 28, 2023

(65) Prior Publication Data

US 2024/0020263 A1   Jan. 18, 2024

Related U.S. Application Data

(63) Continuation of application No. 17/494,821, filed on Oct. 5, 2021, now Pat. No. 11,803,503.

(60) Provisional application No. 63/219,382, filed on Jul. 8, 2021.

(51) Int. Cl.
*G06F 13/42* (2006.01)
*G06F 1/3234* (2019.01)
*G06F 13/362* (2006.01)
*G06F 13/40* (2006.01)

(52) U.S. Cl.
CPC ........ *G06F 13/4221* (2013.01); *G06F 1/3253* (2013.01); *G06F 13/362* (2013.01); *G06F 13/4004* (2013.01); *G06F 2213/0026* (2013.01)

(58) Field of Classification Search
CPC .............. G06F 13/362; G06F 13/4221; G06F 13/4004; G06F 1/3253; G06F 2213/0026
USPC ......................................................... 710/313
See application file for complete search history.

(56) References Cited

U.S. PATENT DOCUMENTS

| | | | |
|---|---|---|---|
| 7,793,010 B2 | 9/2010 | Olson | |
| 9,280,199 B2 * | 3/2016 | Saito | G06F 1/3287 |
| 9,842,075 B1 | 12/2017 | Davis | |
| 10,191,882 B2 | 1/2019 | Egi | |
| 10,482,050 B2 | 11/2019 | Klacar | |
| 10,884,960 B2 | 1/2021 | Suresh | |
| 2009/0063894 A1 | 3/2009 | Billau | |
| 2016/0357695 A1 | 12/2016 | Johnston | |

(Continued)

FOREIGN PATENT DOCUMENTS

| | | |
|---|---|---|
| CN | 103069771 B | 8/2016 |
| CN | 106713183 B | 3/2020 |
| TW | 201003407 A1 | 1/2010 |

*Primary Examiner* — Brian T Misiura
(74) *Attorney, Agent, or Firm* — Winston Hsu

(57) ABSTRACT

A chip includes a peripheral component interconnect express (PCIe) switch, a dual-mode device, and a signal transmission control circuit. The PCIe switch includes a first downstream port. The dual-mode device switches between a root complex (RC) mode and an endpoint (EP) mode. The signal transmission control circuit is coupled between the PCIe switch and the dual-mode device. The first downstream port communicates with the dual-mode device operating under the EP mode. The signal transmission control circuit allows an external PCIe device to communicate with the dual-mode device operating under the RC mode.

9 Claims, 11 Drawing Sheets

(56) References Cited

U.S. PATENT DOCUMENTS

2020/0073840 A1     3/2020   Mekad
2021/0334226 A1    10/2021   Yeung

* cited by examiner

CHIP HAVING DUAL-MODE DEVICE THAT SWITCHES BETWEEN ROOT COMPLEX MODE AND ENDPOINT MODE IN DIFFERENT SYSTEM STAGES AND ASSOCIATED COMPUTER SYSTEM

CROSS REFERENCE TO RELATED APPLICATION

This application is a continuation application of U.S. application Ser. No. 17/494,821, filed on Oct. 5, 2021, which claims the benefit of U.S. Provisional Application No. 63/219,382, filed on Jul. 8, 2021. The contents of these applications are incorporated herein by reference.

BACKGROUND

The present invention relates to a peripheral component interconnect express (PCIe) fabric design, and more particularly, to a chip having a dual-mode device that switches between a root complex mode and an endpoint mode in different system stages and an associated computer system.

There are basically three different types of components in a PCIe system: root complexes, PCIe switches, and endpoints. The root complex is implemented in a PCIe host, and is the root of an input/output (I/O) hierarchy that connects a central processing unit (CPU) subsystem and a memory subsystem to an I/O subsystem. The PCIe switch is a logical assembly of multiple virtual PCI-to-PCI bridge devices. The endpoint is implemented in a PCIe device, and can be the requester of a PCIe transaction either on its own behalf or on behalf of a distinct non-PCIe device. To support a power saving feature, a conventional PCIe system may be configured to have two dedicated PCIe hosts, including a primary PCIe host with higher power consumption and a secondary PCIe host with lower power consumption. When the conventional PCIe system operates in a normal mode, the primary PCIe host is active, while the dedicated secondary PCIe host is turned off. When the conventional PCIe system operates in a power saving mode, the primary PCIe host is turned off for power consumption reduction, while the secondary PCIe host is turned on to take the place of the primary PCIe host for dealing with a system wakeup event from any PCIe device. In addition, the conventional PCIe system may be configured to have additional physical lane switches for providing needed connections between the PCIe switch and the PCIe devices under the normal mode and providing needed connections between the secondary PCIe host and the PCIe devices under the power saving mode. The use of the dedicated PCIe host with lower power consumption and/or the additional physical lane switches leads to a higher hardware cost, inevitably.

SUMMARY

One of the objectives of the claimed invention is to provide a chip having a dual-mode device that switches between a root complex mode and an endpoint mode in different system stages and an associated computer system.

According to a first aspect of the present invention, an exemplary chip is disclosed. The exemplary chip includes a peripheral component interconnect express (PCIe) switch, a dual-mode device, and a signal transmission control circuit. The PCIe switch includes a first downstream port. The dual-mode device is arranged to switch between a root complex (RC) mode and an endpoint (EP) mode. The signal transmission control circuit is coupled between the PCIe switch and the dual-mode device. The first downstream port is arranged to communicate with the dual-mode device operating under the EP mode. The signal transmission control circuit is arranged to allow an external PCIe device to communicate with the dual-mode device operating under the RC mode.

According to a second aspect of the present invention, an exemplary computer system is disclosed. The exemplary computer system includes a chip. The chip includes a peripheral component interconnect express (PCIe) switch, a dual-mode device arranged to switch between a root complex (RC) mode and an endpoint (EP) mode, and a signal transmission control circuit. The exemplary computer system further includes a PCIe host that is external to the chip and coupled to the PCIe switch. During a normal operation stage of the computer system, the PCIe host is arranged to act as a primary PCIe host, and the dual-mode device is arranged to operate under the EP mode, and is coupled to the PCIe switch via one connection path. During a power saving stage of the computer system, the PCIe host is arranged to enter a power saving mode, the dual-mode device is arranged to operate under the RC mode to act as a secondary PCIe host, and the signal transmission control circuit is arranged to enable another connection path for coupling the dual-mode device to the PCIe switch.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
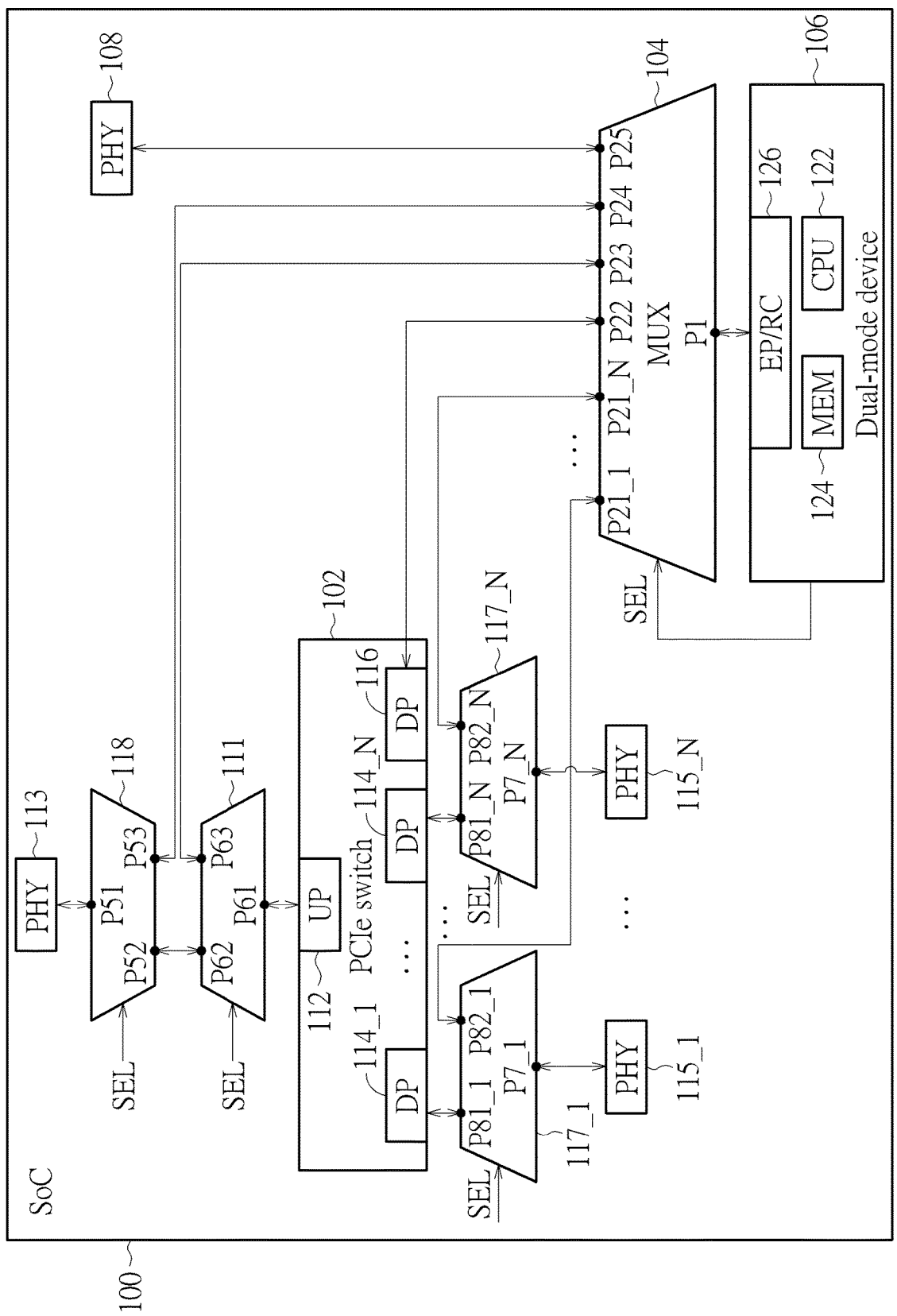
FIG. 1 is a diagram illustrating a system on a chip (SoC) that supports a peripheral component interconnect express (PCIe) power saving feature according to an embodiment of the present invention.

FIG. 1 is a diagram illustrating a system on a chip (SoC) that supports a peripheral component interconnect express (PCIe) power saving feature according to an embodiment of the present invention. The SoC 100 includes a PCIe switch 102, a multiplexer (MUX) 104, a dual-mode device 106, and a physical layer (PHY) circuit (labeled by "PHY") 108. In this embodiment, the PHY circuit 108 is not a part of the PCIe switch 102. It should be noted that only the components pertinent to the present invention are illustrated in FIG. 1. In practice, the SoC 100 may include additional components to achieve other designated functions. The PCIe switch 102 is a multi-port switch including an upstream port (UP) 112, a plurality of downstream ports (DPs) 114_1-114_N (N≥1) and 116, a plurality of physical layer (PHY) circuits (labeled by "PHY") 113 and 115_1-115_N (N≥1), and a plurality of multiplexers 111, 117_1-117_N (N≥1), and 118. Each of the multiplexers 104, 111, 117_1-117_N, and 118 may be regarded as a signal transmission control circuit for controlling signal transmission and/or signal conversion.

The dual-mode device 106 supports a root complex (RC) mode and an endpoint (EP) mode, and is arranged to dynamically switch between the RC mode and the EP mode, depending upon different system stages such as a normal operation stage (e.g. normal mode) or a power saving stage (e.g. sleep mode). When the dual-mode device 106 is configured by hardware-based means or software-based means to operate under the EP mode, the dual-mode device 106 serves as an on-chip PCIe device. When the dual-mode device 106 is configured by hardware-based means or software-based means to operate under the RC mode, the dual-mode device 106 serves as an on-chip PCIe host that may be a secondary PCIe host with lower power consumption (lower computing power) compared to a primary PCIe host external to the SoC 100. Like the primary PCIe host with higher power consumption (high computing power), the dual-mode device 106 may include a CPU subsystem (labeled by "CPU") 122 and a memory subsystem (labeled by "MEM") 124. In this embodiment, the dual-mode device 106 employs a dual-mode controller (labeled by "EP/RC") 126. The dual-mode controller 126 may have configuration register(s) that can be set to decide an operation mode of the dual-mode controller 126. That is, the dual-mode controller 126 acts as an EP controller (labeled by "EP") under the EP mode or an RC controller (labeled by "RC") under the RC mode, depending upon an operation mode setting written into the configuration register(s).

The multiplexers 111 and 118 are located between the PHY circuit 113 and the UP 112, where the PHY circuit 113 is coupled to one port P51 of the multiplexer 118, the UP 112 is coupled to one port P61 of the multiplexer 111, and another port P52 of the multiplexer 118 is coupled to another port P62 of the multiplexer 111.

Each of the multiplexers 117_1-117_N is coupled between one of DPs 114_1-114_N and one of PHY circuits 115_1-115_N. That is, one multiplexer 117_i (1≤i≤N) is coupled between one DP 114_i and one PHY circuit 115_i. As shown in FIG. 1, the multiplexer 117_1 is located between the PHY circuit 115_1 and the DP 114_1, where the PHY circuit 115_1 is coupled to one port P7_1 of the multiplexer 117_1, and the DP 114_1 is coupled to another port P81_1 of the multiplexer 117_1; and the multiplexer 117_N is located between the PHY circuit 115_N and the DP 114_N, where the PHY circuit 115_N is coupled to one port P7_N of the multiplexer 117_N, and the DP 114_N is coupled to another port P81_N of the multiplexer 117_N.

The multiplexer 104 is located between the PCIe switch 102 and the dual-mode device 106, and includes a device-side port P1 and a plurality of switch-side ports P21_1-P21_N (N≥1), P22, P23, P24, P25 for connection path selection. In this embodiment, the device-side port P1 is coupled to the dual-mode device 106, the switch-side ports P21_1-P21_N are coupled to the multiplexers 117_1-117_N (particularly, ports P82_1-P82_N of multiplexers 117_1-117_N), respectively, the switch-side port P22 is coupled to the DP 116, the switch-side port P23 is coupled to the multiplexer 111 (particularly, port P63 of multiplexer 111), the switch-side port P24 is coupled to the multiplexer 118 (particularly, port P53 of multiplexer 118), and the switch-side port P25 is coupled to the PHY circuit 108. With a proper control of the multiplexer 118, the switch-side port P24 may be coupled to the PHY circuit 113. For example, the multiplexer 118 may enable the internal interconnection between ports P51 and P52 when the dual-mode device 106 enters the EP mode, and may enable the internal interconnection between ports P51 and P53 when the dual-mode device 106 enters the RC mode and the multiplexer 104 couples the device-side port P1 to the switch-side port P24. With a proper control of the multiplexer 111, the switch-side port P23 may be coupled to the UP 112. For example, the multiplexer 111 may enable the internal interconnection between ports P61 and P62 when the dual-mode device 106 enters the EP mode, and may enable the internal interconnection between ports P61 and P63 when the dual-mode device 106 enters the RC mode and the multiplexer 104 couples the device-side port P1 to the switch-side port P23. With a proper control of the multiplexer 117_i (1≤i≤N), the switch-side port P21_i may be coupled to the PHY circuit 115_i. For example, the multiplexer 117_i (1≤i≤N) may enable the internal interconnection between ports P7_i and P81_i when the dual-mode device 106 enters the EP mode, and may enable the internal interconnection between ports P7_i and P82_i when the dual-mode device 106 enters the RC mode and the multiplexer 104 couples the device-side port P1 to the switch-side port P21_i.

By way of example, but not limitation, the dual-mode device 106 (particularly, CPU subsystem 122 of dual-mode device 106) may generate a control signal SEL to the multiplexer 104 to control internal interconnection between the device-side port P1 and the switch-side ports P21_1-P21_N, P22, P23, P24, P25, and may further use the control signal SEL to control internal interconnection of at least one of the multiplexers 111, 117_1-117_N, 118. For example, the multiplexer 104 is arranged to couple the device-side port P1 to the switch-side port P22 when the dual-mode device 106 enters the EP mode, and couple the device-side port P1 to one of the switch-side ports P21_1-P21_N, P23, P24, P25 when the dual-mode device 106 enters the RC mode. Using the dual-mode device 106 to generate the control signal SEL is for illustrative purposes only. In practice, any means capable of generating the control signal SEL to the multiplexer 104 may be adopted.

Since the dual-mode device 106 and the PCIe switch 102 are both internal components of the same chip, the DP 116 is allowed to be coupled to the switch-side port P22 without via any PCIe PHY circuit, and the dual-mode device 106 is allowed to be coupled to the device-side port P1 without via any PCIe PHY circuit. That is, PCIe physical signals can be exchanged between the dual-mode device 106 and the DP 116 implemented inside the same chip without the need of PCIe PHY circuits. However, when an external PCIe device (e.g. off-chip PCIe device) is coupled to (e.g. directly connected to or indirectly connected to) the internal PCIe switch 102, one PCIe PHY circuit at the external PCIe device and one PCIe PHY circuit at the internal PCIe switch 102 are needed for PCIe physical signal exchange. Similarly, when an external PCIe host (e.g. off-chip PCIe host) is coupled to (e.g. directly connected to or indirectly connected to) the internal PCIe switch 102, one PCIe PHY circuit at the external PCIe host and one PCIe PHY circuit at the internal PCIe switch 102 are needed for PCIe physical signal exchange. However, these are for illustrative purposes only, and are not meant to be limitations of the present invention. Alternatively, a PCIe PHY circuit may be equipped between the DP 116 and the switch-side port P22.

Figure 2:
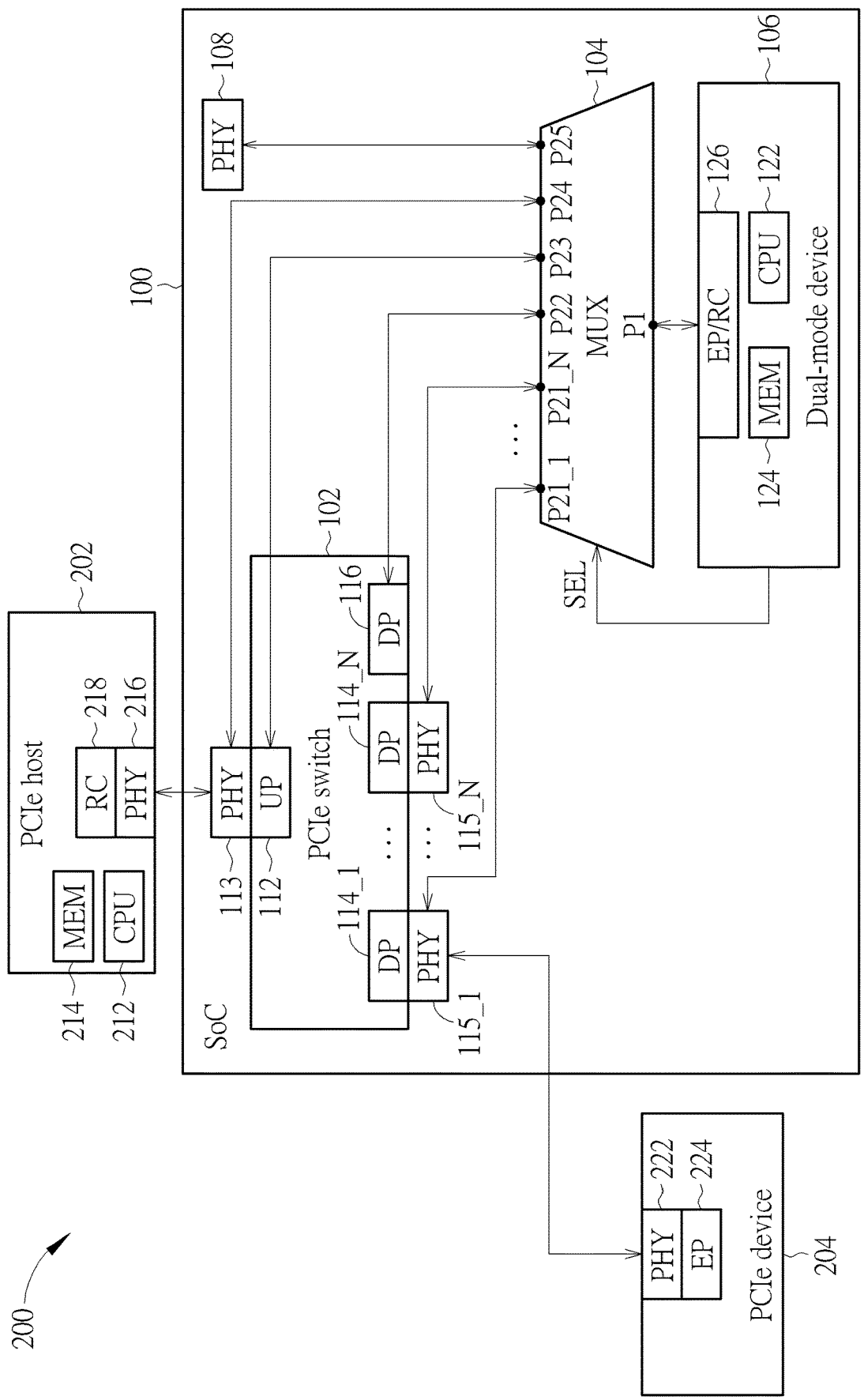
FIG. 2 is a diagram illustrating a first computer system using the SoC shown in FIG. 1 according to an embodiment of the present invention.

FIG. 2 is a diagram illustrating a first computer system using the SoC 100 shown in FIG. 1 according to an embodiment of the present invention. The computer system 200 includes the SoC 100, a PCIe host 202, and a PCIe device 204, where the PCIe host 202 and the PCIe device 204 are both external to the SoC 100. For brevity and simplicity, the multiplexers 111, 117_1-117_N, 118 shown in FIG. 1 are omitted in FIG. 2. A skilled person should readily appreciate that certain connections required by the PCIe switch 102 can be provided by one or some of the multiplexers 111, 117_1-117_N, 118. The PCIe host 202 may be a primary PCIe host with higher power consumption (higher computing power) compared to a secondary PCIe host that may be implemented by the dual-mode device 106 operating under the RC mode. The PCIe host 202 may include a CPU subsystem (labeled by "CPU") 212, a memory subsystem (labeled by "MEM") 214, and an RC controller (labeled by "RC") 218. In addition, the RC controller 218 of the PCIe host 202 can communicate with the UP 112 of the PCIe switch 102 via a direct connection between a PHY circuit 216 of the RC controller 218 and the PHY circuit 113 of the UP 112. However, this is for illustrative purposes only, and is not meant to be a limitation of the present invention. In one alternative design, the RC controller 218 of the PCIe host 202 can communicate with the UP 112 of the PCIe switch 102 via an indirect connection between the PHY circuit 216 of the RC controller 218 and the PHY circuit 113 of the UP 112. For example, the computer system 200 may be modified to have an external PCIe switch between the PCIe host 202 and the SoC 100, where the indirect connection between the PHY circuit 216 of the RC controller 218 and the PHY circuit 113 of the UP 112 may include an UP and a DP of the external PCIe switch and associated PHY circuits of the UP and the DP of the external PCIe switch. Specifically, the PHY circuit 216 of the RC controller 218 is coupled to the PHY circuit of the UP of the external PCIe switch, and the PHY circuit 113 of the UP 112 is coupled to the PHY circuit of the DP of the external PCIe switch. To put it simply, the present invention has no limitations on the connection topology between the PCIe host 202 and the SoC 100 (particularly, PCIe switch 102 of SoC 100).

Regarding the PCIe device 204, it includes an EP controller (labeled by "EP") 224 that can communicate with the DP 114_1 of the PCIe switch 102 via a direct connection between a PHY circuit 222 of the EP controller 224 and the PHY circuit 115_1 of the DP 114_1. However, this is for illustrative purposes only, and is not meant to be a limitation of the present invention. In another alternative design, the EP controller 224 of the PCIe device 204 can communicate with the DP 114_1 of the PCIe switch 102 via an indirect connection between the PHY circuit 222 of the EP controller 224 and the PHY circuit 115_1 of the DP 114_1. For example, the computer system 200 may be modified to have an external PCIe switch between the PCIe device 204 and the SoC 100, where the indirect connection between the PHY circuit 222 of the EP controller 224 and the PHY circuit 115_1 of the DP 114_1 may include an UP and a DP of the external PCIe switch and associated PHY circuits of the UP and the DP of the external PCIe switch. Specifically, the PHY circuit 222 of the EP controller 224 is coupled to the PHY circuit of the DP of the external PCIe switch, and the PHY circuit 115_1 of the DP 114_1 is coupled to the PHY circuit of the UP of the external PCIe switch. To put it simply, the present invention has no limitations on the connection topology between the PCIe device 204 and the SoC 100 (particularly, PCIe switch 102 of SoC 100).

In yet another alternative design, the RC controller 218 of the PCIe host 202 can communicate with the UP 112 of the PCIe switch 102 via an indirect connection (e.g. one external PCIe switch) between the PHY circuit 216 of the RC controller 218 and the PHY circuit 113 of the UP 112, and the EP controller 224 of the PCIe device 204 can communicate with the DP 114_1 of the PCIe switch 102 via an indirect connection (e.g. another external PCIe switch) between the PHY circuit 222 of the EP controller 224 and the PHY circuit 115_1 of the DP 114_1. These alternative designs all fall within the scope of the present invention.

In this embodiment, only one external PCIe device 204 is illustrated in FIG. 1 for brevity and simplicity. It should be noted that, when the number of DPs 114_1-114_N implemented in the PCIe switch 102 is larger than 1 (i.e. N>1), the computer system 200 may have multiple external PCIe devices coupled to different DPs 114_1-114_N implemented in the PCIe switch 102.

Figure 3:
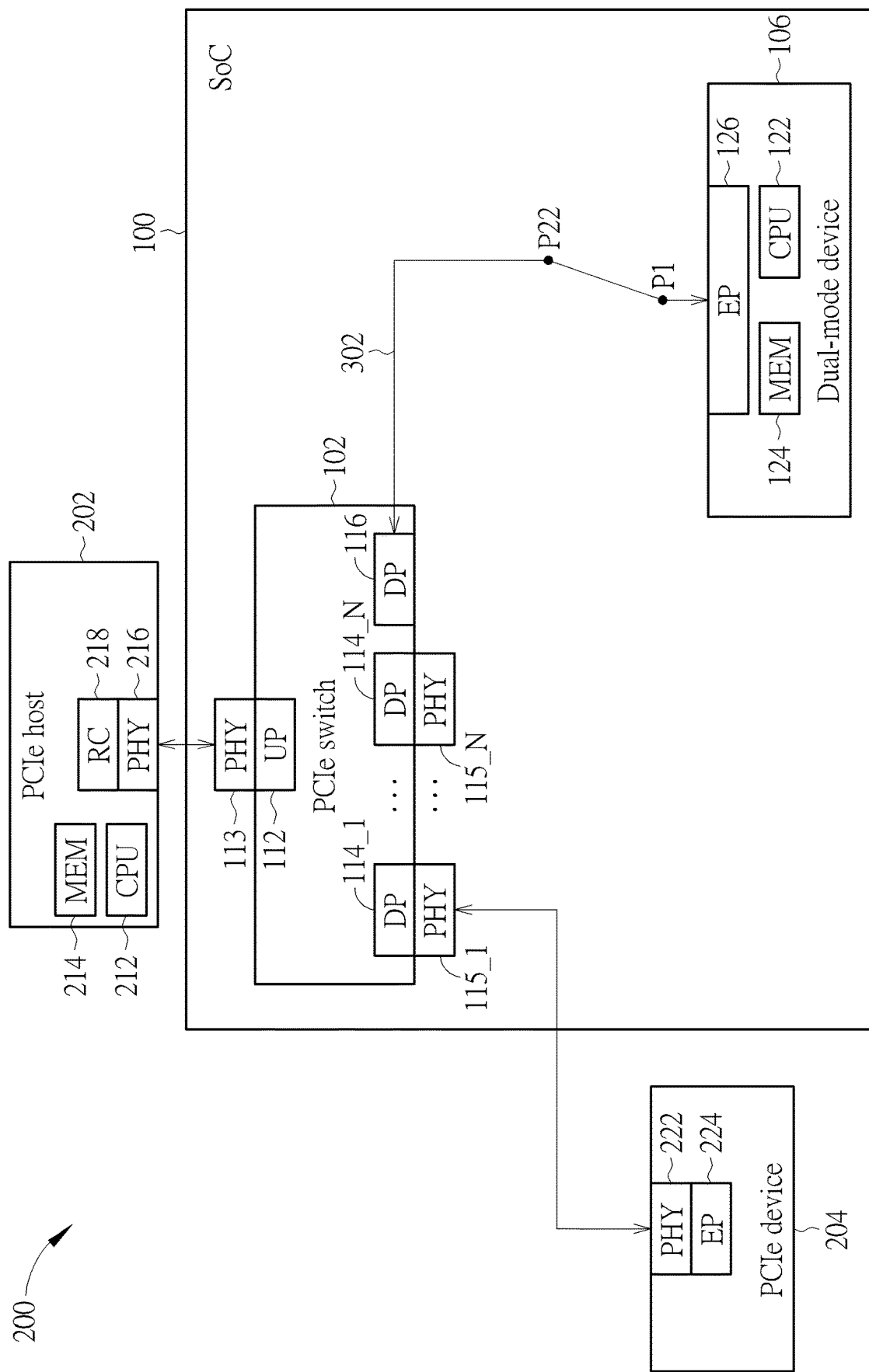
FIG. 3 is a diagram illustrating a configuration of the first computer system in a normal operation stage according to an embodiment the present invention.

Please refer to FIG. 2 in conjunction with FIG. 3. FIG. 3 is a diagram illustrating a configuration of the computer system 200 in a normal operation stage according to an embodiment the present invention. After the computer system 200 is successfully powered on through a boot sequence, the computer system 200 enters a normal operation stage. During the normal operation stage, the PCIe host 202 is arranged to act as a primary PCIe host, the PCIe device 204 is coupled to the PCIe switch 102, the dual-mode device 106 is arranged to operate under the EP mode for acting as an on-chip PCIe device, and the multiplexer 104 is instructed by the control signal SEL to enable one connection path 302 for coupling the dual-mode device 106 to the PCIe switch 102. More specifically, the multiplexer 104 couples the device-side port P1 to the switch-side port P22, the multiplexers 111 and 118 couple the UP 112 to the PHY circuit 113, and the multiplexer 117_1 couples the PHY circuit 115_1 to the DP 114_1. Hence, the primary PCIe host (i.e. PCIe host 202) can fully control the PCIe device 204

(which is external to the SoC 100) through the PCIe switch 102, and can fully control the on-chip PCIe device (which is implemented by the dual-mode device 106 operating under the EP mode) through the PCIe switch 102.

Figure 4:
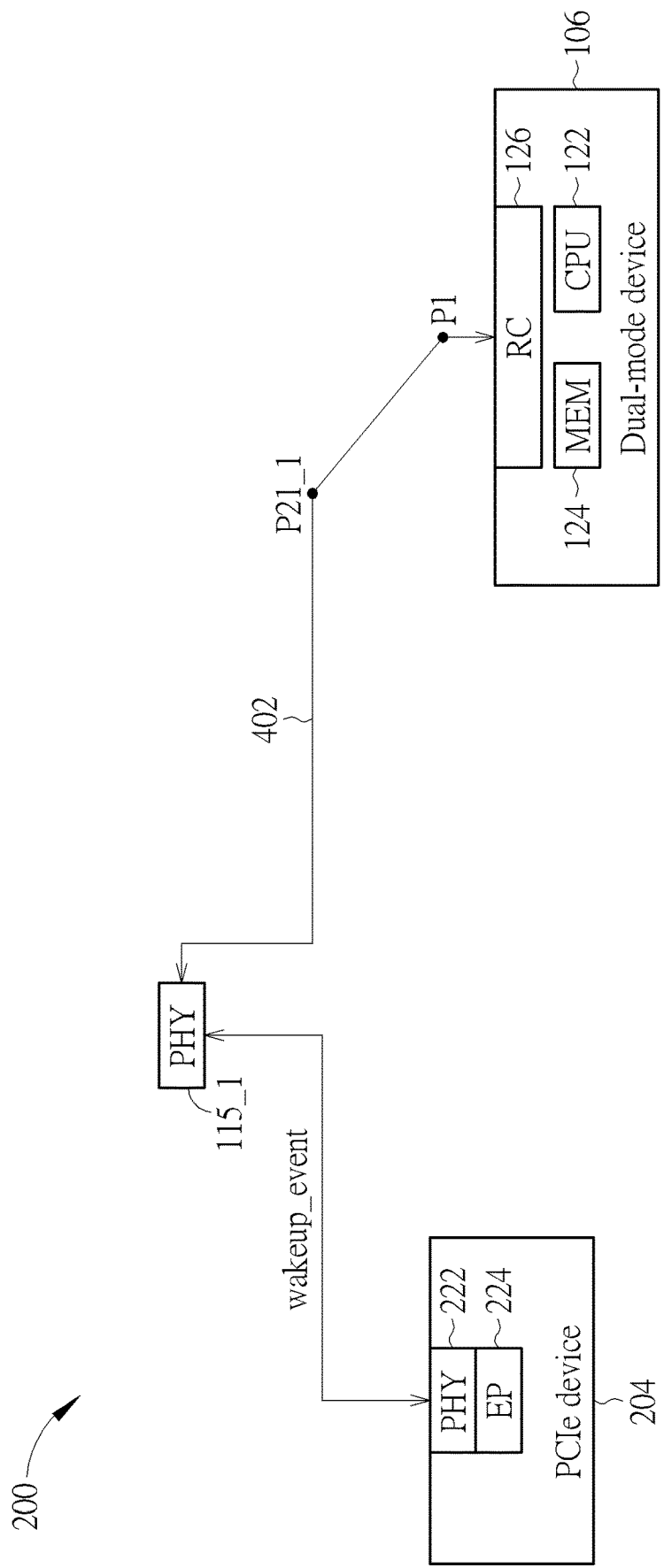
FIG. 4 is a diagram illustrating one configuration of the first computer system in a power saving stage according to an embodiment the present invention.

Please refer to FIG. 2 in conjunction with FIG. 4. FIG. 4 is a diagram illustrating one configuration of the computer system 200 in a power saving stage according to an embodiment the present invention. For certain applications, the computer system 200 may leave the normal operation stage and then enter a power saving stage (e.g., sleep mode) for reducing the system power consumption. During the power saving stage, the PCIe host 202 is arranged to enter a power saving mode (e.g. power off mode), that is, may have no capability of handling/controlling the device, the PCIe device 204 is still coupled to the PCIe switch 102, the dual-mode device 106 is arranged to operate under the RC mode for acting as a secondary PCIe host (which is an on-chip PCIe host), and the multiplexer 104 is instructed by the control signal SEL to enable another connection path 402 for coupling the dual-mode device 106 to the PCIe switch 102. More specifically, the multiplexer 104 couples the device-side port P1 to the switch-side port P21_1, and the multiplexer 117_1 is instructed by the control signal SEL to enable the internal interconnection between ports P7_1 and P82_1. Hence, the secondary PCIe host (i.e. dual-mode device 106 operating under the RC mode) can fully control the PCIe device 204 (which is external to the SoC 100) through communicating with the PCIe device 204 via at least the PHY circuit 115_1 and the connection path 402. In other words, the low-power secondary PCIe host (i.e. dual-mode device 106 operating under the RC mode) can process the device data from the PCIe device 204. In this way, the low-power secondary PCIe host (i.e. dual-mode device 106 operating under the RC mode) can handle a system wakeup event wakeup_event triggered by the PCIe device 204. For example, the PCIe device 204 may be an input device such as a mouse, a keyboard, or a joystick. In response to the system wakeup event wakeup_event from the PCIe device 204, the computer system 200 may leave the power saving stage (e.g., sleep mode) and then enter the normal operation stage again.

To achieve more system power consumption reduction during the power saving stage, some or all of the unused components of the PCIe switch 102 may be controlled to enter a power saving mode (e.g. power off mode), that is, may have no capability of handling/controlling the device. For example, all of the UP 112, the DPs 114_1-114_N, 116, the multiplexers 111, 115_N, 118, and the PHY circuits 113, 115_N may be turned off, that is, may have no capability of handling/controlling the device.

Figure 5:
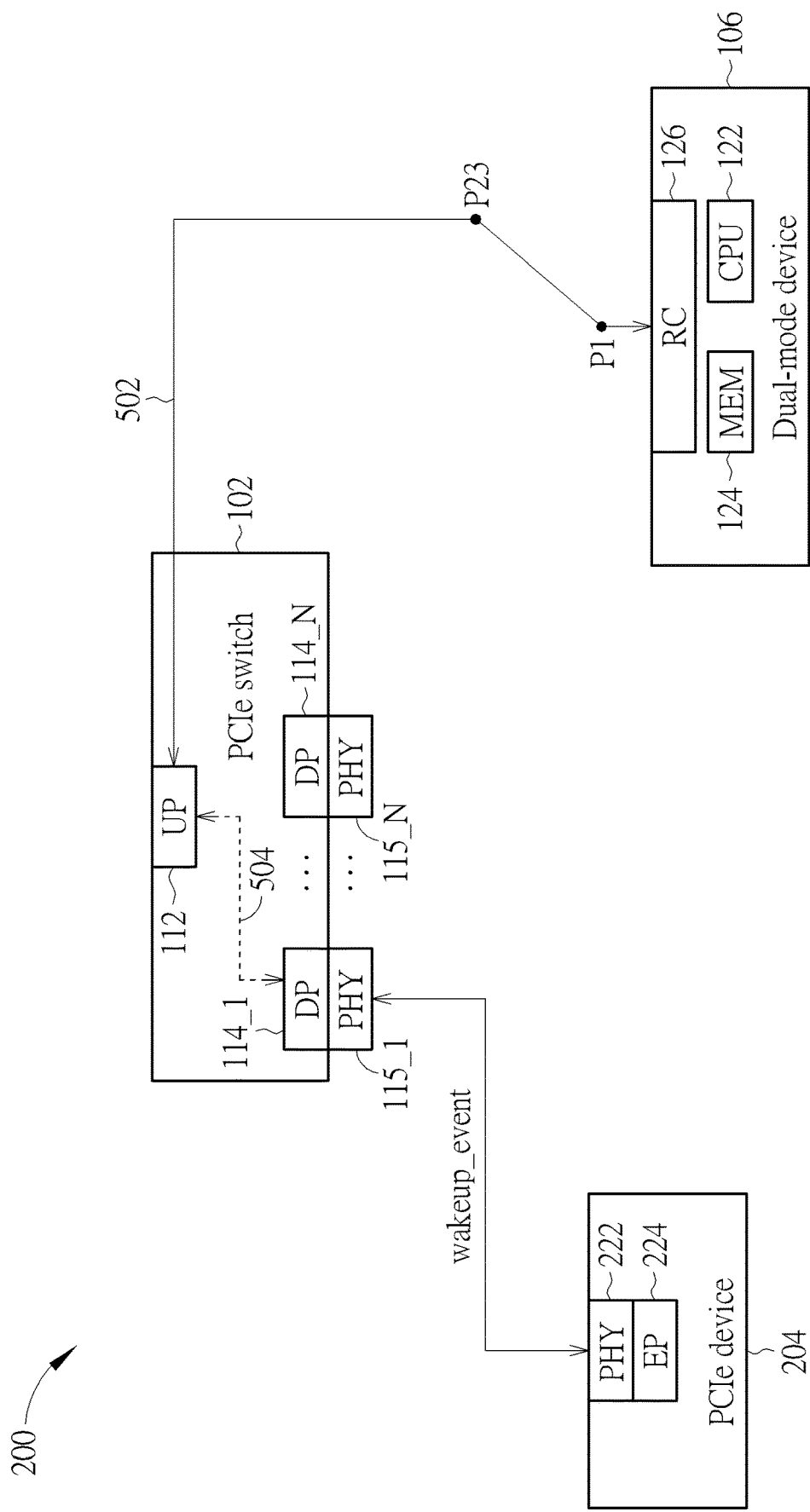
FIG. 5 is a diagram illustrating another configuration of the first computer system in a power saving stage according to an embodiment the present invention.

Please refer to FIG. 2 in conjunction with FIG. 5. FIG. 5 is a diagram illustrating another configuration of the computer system 200 in a power saving stage according to an embodiment the present invention. For certain applications, the computer system 200 may leave the normal operation stage and then enter the power saving stage (e.g., sleep mode) for reducing the system power consumption. During the power saving stage, the PCIe host 202 is arranged to enter a power saving mode (e.g. power off mode), that is, may have no capability of handling/controlling the device, the PCIe device 204 is still coupled to the PCIe switch 102, the dual-mode device 106 is arranged to operate under the RC mode for acting as a secondary PCIe host (which is an on-chip PCIe host), and the multiplexer 104 is instructed by the control signal SEL to enable another connection path 502 for coupling the dual-mode device 106 to the PCIe switch 102. More specifically, the multiplexer 104 couples the device-side port P1 to the switch-side port P23, the multiplexer 117_1 is instructed by the control signal SEL to maintain the internal interconnection between ports P7_1 and P81_1, and the multiplexer 111 is instructed by the control signal SEL to enable the internal interconnection between ports P61 and P63. Hence, the secondary PCIe host (i.e. dual-mode device 106 operating under the RC mode) can fully control the PCIe device 204 (which is external to the SoC 100) through communicating with the PCIe device 204 via at least the PHY circuit 115_1, the DP 114_1, an internal connection path 504 between DP 114_1 and UP 112, the UP 112, and the connection path 502. In other words, the low-power secondary PCIe host (i.e. dual-mode device 106 operating under the RC mode) can process the device data from the PCIe device 204. In this way, the low-power secondary PCIe host (i.e. dual-mode device 106 operating under the RC mode) can handle a system wakeup event wakeup_event triggered by the PCIe device 204. For example, the PCIe device 204 may be an input device such as a mouse, a keyboard, or a joystick. In response to the system wakeup event wakeup_event from the PCIe device 204, the computer system 200 may leave the power saving stage (e.g., sleep mode) and then enter the normal operation stage again.

To achieve more system power consumption reduction during the power saving stage, some or all of the unused components of the PCIe switch 102 may be controlled to enter a power saving mode (e.g. power off mode), that is, may have no capability of handling/controlling the device. For example, the DP 116, the multiplexer 118, and the PHY circuit 113 may be turned off, that is, may have no capability of handling/controlling the device. If no external PCIe device is coupled to the DP 114_N (N≠1), the DP 114_N and the associated PHY circuit 115_N and multiplexer 117_N may also be turned off, that is, may have no capability of handling/controlling the device. If another external PCIe device (not shown) is coupled to the DP 114_N (N≠1), the DP 114_N, the multiplexer 117_N and the PHY circuit 115_N may remain active, and the secondary PCIe host (i.e. dual-mode device 106 operating under the RC mode) can fully control the another external PCIe device through communicating with the another external PCIe device via at least the PHY circuit 115_N (N≠1), the DP 114_N, an internal connection path between DP 114_N and UP 112, the UP 112, and the connection path 502. In this way, the low-power secondary PCIe host (i.e. dual-mode device 106 operating under the RC mode) can also handle a system wakeup event triggered from the another external PCIe device.

Figure 6:
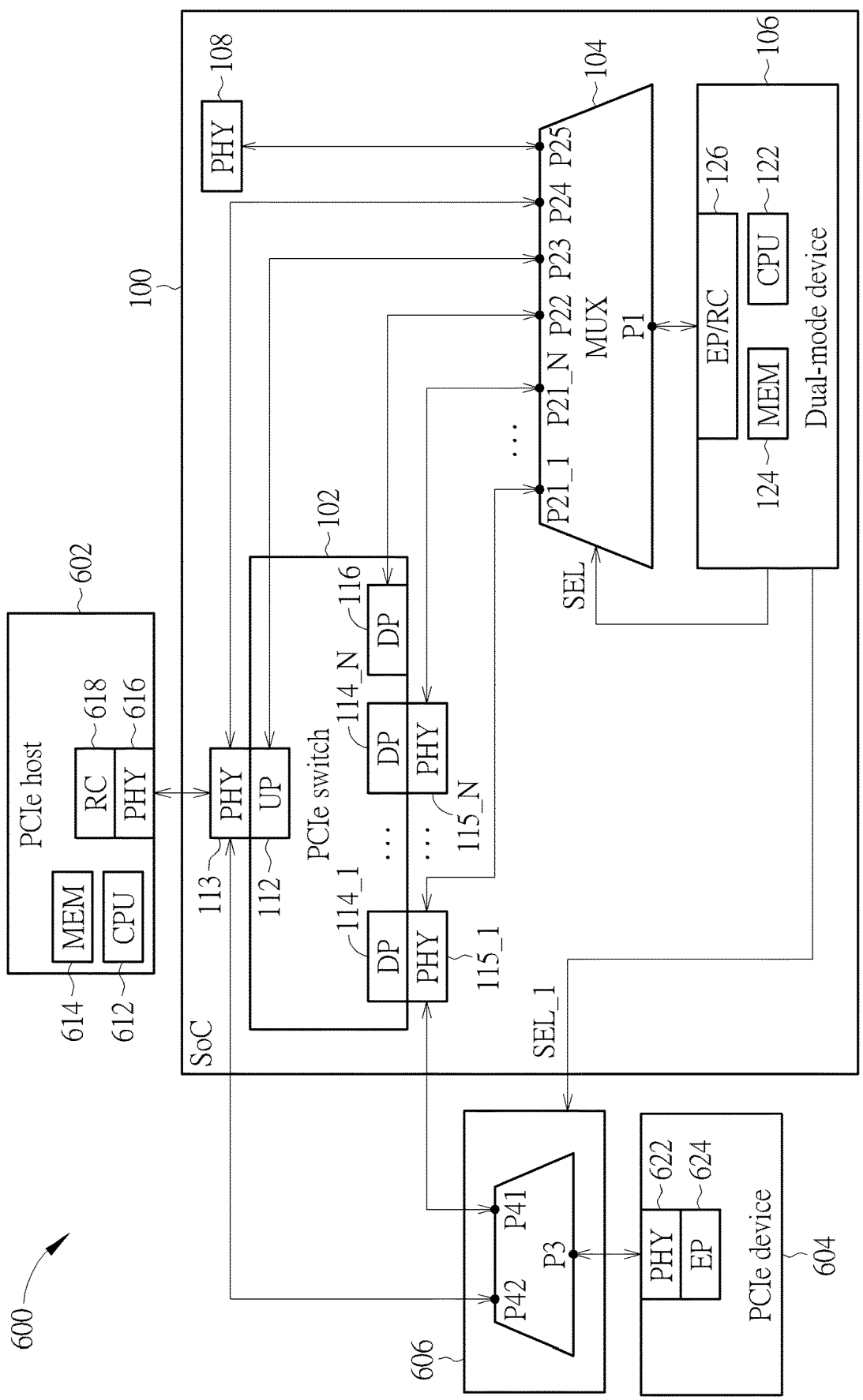
FIG. 6 is a diagram illustrating a second computer system using the SoC shown in FIG. 1 according to an embodiment of the present invention.

FIG. 6 is a diagram illustrating a second computer system using the SoC 100 shown in FIG. 1 according to an embodiment of the present invention. The computer system 600 includes the SoC 100, a PCIe host 602, a PCIe device 604, and a physical lane switch 606, where the PCIe host 602, the PCIe device 604 and the physical lane switch 606 are all external to the SoC 100. For brevity and simplicity, the multiplexers 111, 117_1-117_N, 118 shown in FIG. 1 are omitted in FIG. 6. A skilled person should readily appreciate that certain connections required by the PCIe switch 102 can be provided by one or some of the multiplexers 111, 117_1-117_N, 118. The PCIe host 602 may be a primary PCIe host with higher power consumption (higher computing power) compared to a secondary PCIe host that may be implemented by the dual-mode device 106 operating under the RC mode. The PCIe host 602 may include a CPU subsystem (labeled by "CPU") 612 and a memory subsystem (labeled by "MEM") 614. In addition, an RC controller (labeled by "RC") 618 of the PCIe host 602 can communicate with the UP 112 of the PCIe switch 102 via a PHY circuit 616 of the RC controller 618 and the PHY circuit 113 of the UP 112.

The physical lane switch 606 is an external device located between the PCIe device 604 and the SoC 100 (particularly, PCIe switch 102 of SoC 100), and includes a device-side port P3 and a plurality of SoC-side ports P41 and P42 for connection path selection. In this embodiment, the device-side port P3 is coupled to the PCIe device 604, the SoC-side port P41 is coupled to the PHY circuit 115_1, and the SoC-side port P42 is coupled to the PHY circuit 113. By way of example, but not limitation, the dual-mode device 106 may generate another control signal SEL_1 to the physical lane switch 606 to control internal interconnection between the device-side port P3 and the SoC-side ports P41, P42. For example, the physical lane switch 606 is arranged to couple the device-side port P3 to the SoC-side port P41 when the computer system 600 enters a normal operation stage (e.g. normal mode), and is arranged to couple the device-side port P3 to the SoC-side port P42 when the computer system 600 enters a power saving stage (e.g. sleep mode). Using the dual-mode device 106 to generate the control signal SEL_1 is for illustrative purposes only. In practice, any means capable of generating the control signal SEL_1 to the physical lane switch 606 may be adopted.

It should be noted that, when an external PCIe device (e.g. off-chip PCIe device) is coupled to the internal PCIe switch 102, one PCIe PHY circuit at the external PCIe device and one PCIe PHY circuit at the internal PCIe switch 102 are needed for PCIe physical signal exchange; and when an external PCIe host (e.g. off-chip PCIe host) is coupled to the internal PCIe switch 102, one PCIe PHY circuit at the external PCIe host and one PCIe PHY circuit at the internal PCIe switch 102 are needed for PCIe physical signal exchange.

Regarding the PCIe device 604, it includes an EP controller (labeled by "EP") 624 that can communicate with the DP 114_1 of the PCIe switch 102 via a PHY circuit 622 of the EP controller 624, the physical lane switch 606, the PHY circuit 115_1 of the DP 114_1, and the multiplexer 117_1. In this embodiment, only one external PCIe device 604 and only one physical lane switch 606 are illustrated in FIG. 6 for brevity and simplicity. It should be noted that, when the number of DPs 114_1-114_N implemented in the PCIe switch 102 is larger than 1 (i.e. N>1), the computer system 600 may have multiple external PCIe devices coupled to different DPs 114_1-114_N implemented in the PCIe switch 102, and/or may have one physical lane switch for each of the external PCIe devices.

Figure 7:
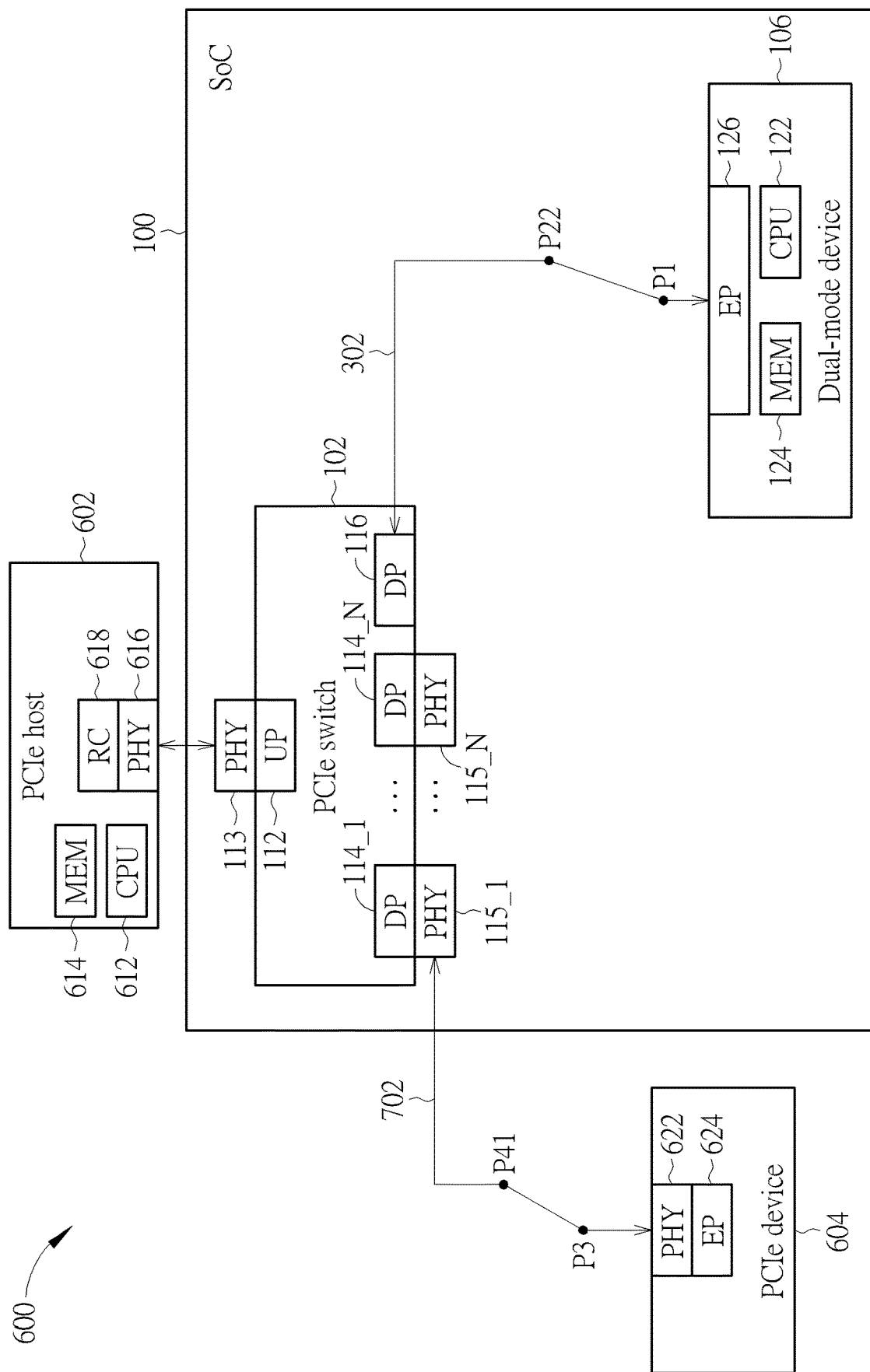
FIG. 7 is a diagram illustrating a configuration of the second computer system in a normal operation stage according to an embodiment the present invention.

Please refer to FIG. 6 in conjunction with FIG. 7. FIG. 7 is a diagram illustrating a configuration of the computer system 600 in a normal operation stage according to an embodiment the present invention. After the computer system 600 is successfully powered on through a boot sequence, the computer system 600 enters a normal operation stage. During the normal operation stage, the PCIe host 602 is arranged to act as a primary PCIe host, the physical lane switch 606 is instructed by the control signal SEL_1 to enable one connection path 702 for coupling the PCIe device 604 to the PCIe switch 102, the dual-mode device 106 is arranged to operate under the EP mode for acting as an on-chip PCIe device, and the multiplexer 104 is instructed by the control signal SEL to enable one connection path 302 for coupling the dual-mode device 106 to the PCIe switch 102. More specifically, the multiplexer 104 couples the device-side port P1 to the switch-side port P22, the multiplexers 111 and 118 couple the UP 112 to the PHY circuit 113, the multiplexer 117_1 couples the PHY circuit 115_1 to the DP 114_1, and the physical lane switch 606 couples the device-side port P3 to the SoC-side port P41. Hence, the primary PCIe host (i.e. PCIe host 602) can fully control the PCIe device 604 (which is external to the SoC 100) through the PCIe switch 102, and can fully control the on-chip PCIe device (which is implemented by the dual-mode device 106 operating under the EP mode) through the PCIe switch 102.

Figure 8:
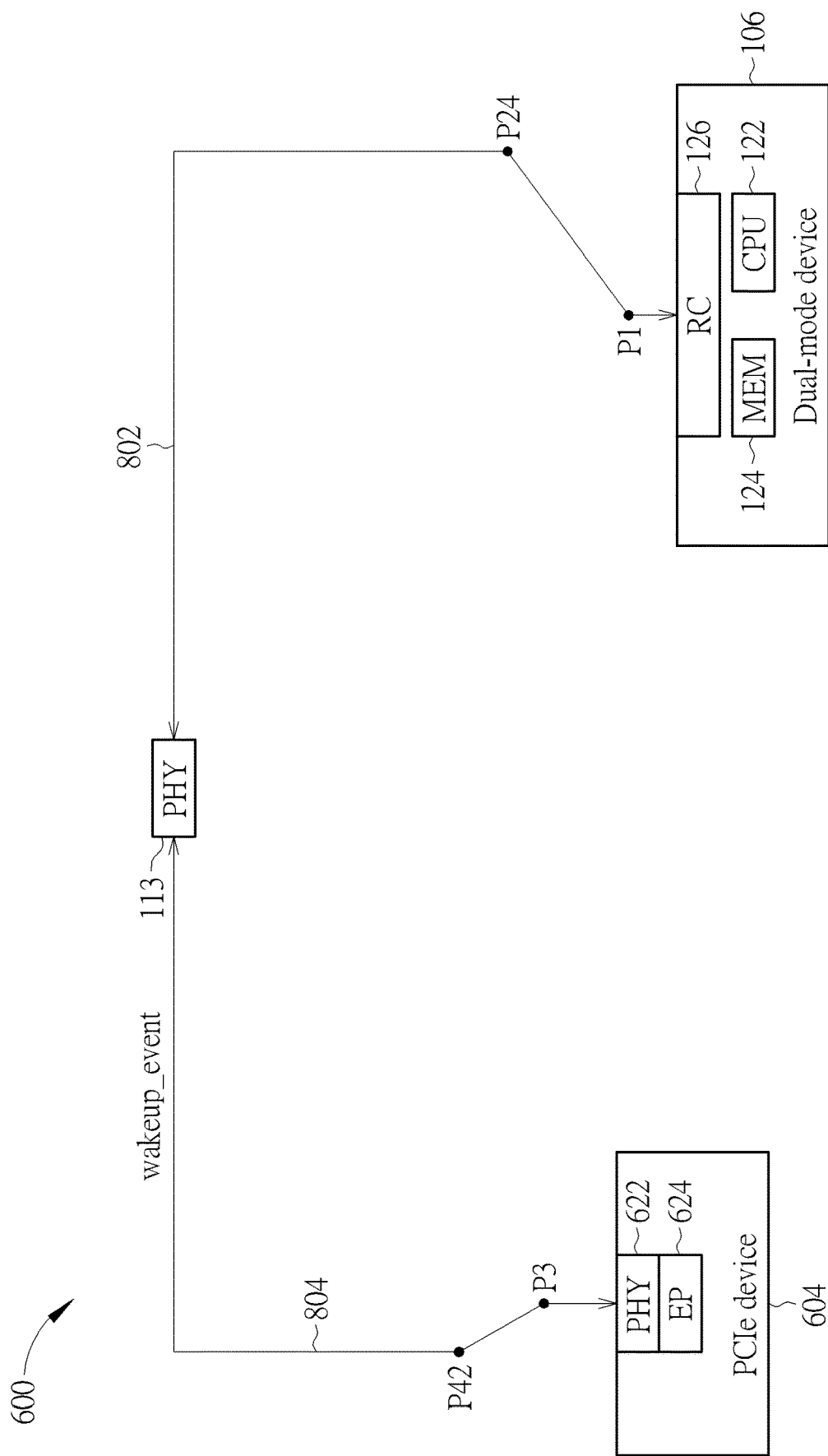
FIG. 8 is a diagram illustrating a configuration of the second computer system in a power saving stage according to an embodiment the present invention.

Please refer to FIG. 6 in conjunction with FIG. 8. FIG. 8 is a diagram illustrating a configuration of the computer system 600 in a power saving stage according to an embodiment the present invention. For certain applications, the computer system 600 may leave the normal operation stage and then enter a power saving stage (e.g., sleep mode) for reducing the system power consumption. During the power saving stage, the PCIe host 602 is arranged to enter a power saving mode (e.g. power off mode), that is, may have no capability of handling/controlling the device, the dual-mode device 106 is arranged to operate under the RC mode for acting as a secondary PCIe host (which is an on-chip PCIe host), the multiplexer 104 is instructed by the control signal SEL to enable another connection path 802 for coupling the dual-mode device 106 to the PCIe switch 102, the multiplexer 118 is instructed by the control signal SEL to enable the internal interconnection between ports P51 and P53, and the physical lane switch 606 is instructed by the control signal SEL_1 to enable another connection path 804 for coupling the PCIe device 604 to the PCIe switch 102. More specifically, the multiplexer 104 couples the device-side port P1 to the switch-side port P24, the multiplexer 118 couples the PHY circuit 113 to the switch-side port P24, and the physical lane switch 606 couples the device-side port P3 to the SoC-side port P42. Hence, the secondary PCIe host (i.e. dual-mode device 106 operating under the RC mode) can fully control the PCIe device 604 (which is external to the SoC 100) through communicating with the PCIe device 604 via at least the connection path 804, the PHY circuit 113, and the connection path 802. In other words, the low-power secondary PCIe host (i.e. dual-mode device 106 operating under the RC mode) can process the device data from the PCIe device 604. In this way, the low-power secondary PCIe host (i.e. dual-mode device 106 operating under the RC mode) can handle a system wakeup event wakeup_event triggered by the PCIe device 604. For example, the PCIe device 604 may be an input device such as a mouse, a keyboard, or a joystick. In response to the system wakeup event wakeup_event from the PCIe device 604, the computer system 600 may leave the power saving stage (e.g., sleep mode) and then enter the normal operation stage again.

To achieve more system power consumption reduction during the power saving stage, some or all of the unused components of the PCIe switch 102 may be controlled to enter a power saving mode (e.g. power off mode), that is, may have no capability of handling/controlling the device. For example, all of the UP 112, the DPs 114_1-114_N, 116, the multiplexers 111, 117_1-117_N, and the PHY circuits 115_1-115_N may be turned off, that is, may have no capability of handling/controlling the device.

Figure 9:
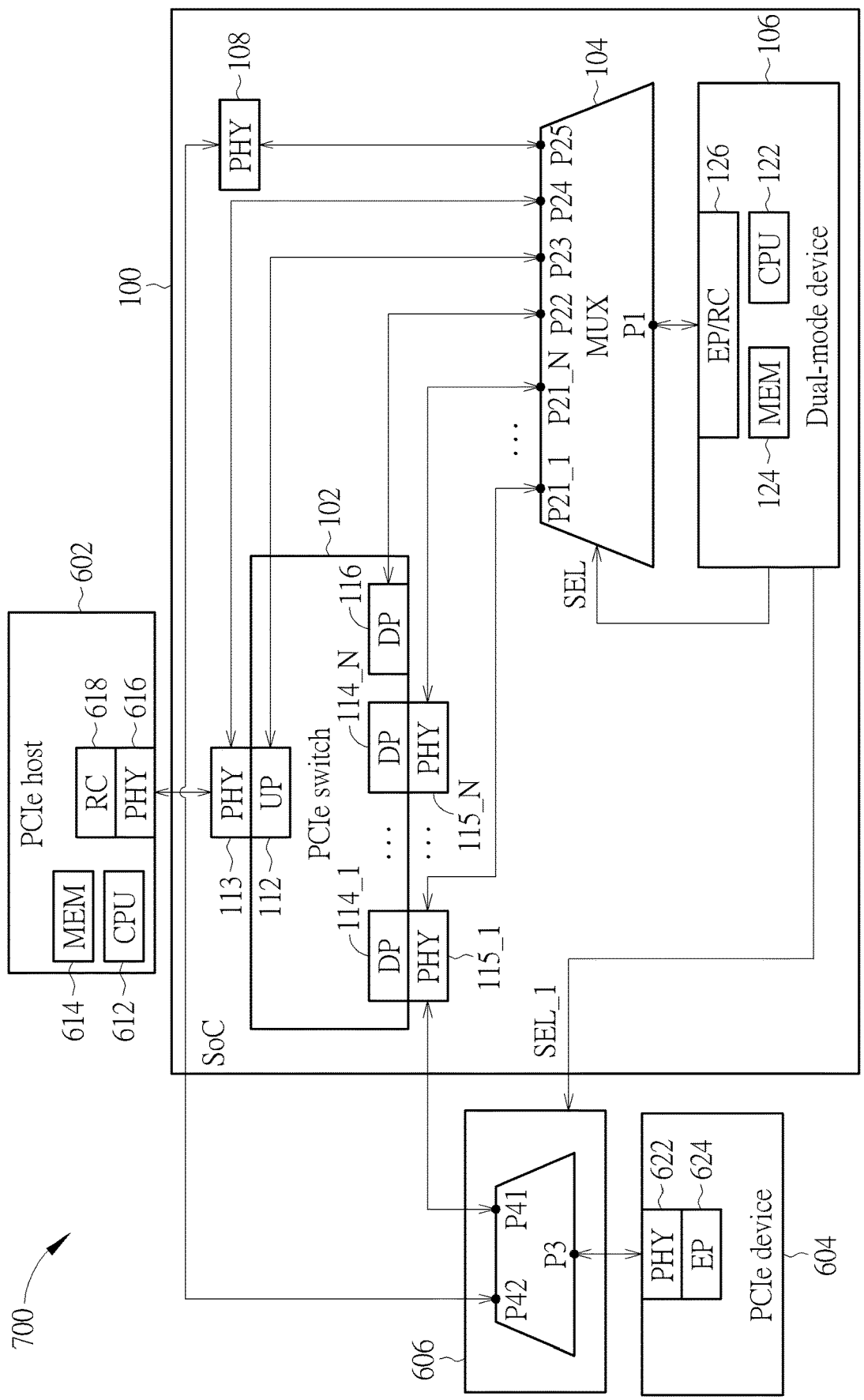
FIG. 9 is a diagram illustrating a third computer system using the SoC shown in FIG. 1 according to an embodiment of the present invention.

FIG. 9 is a diagram illustrating a third computer system using the SoC 100 shown in FIG. 1 according to an embodiment of the present invention. For brevity and simplicity, the multiplexers 111, 117_1-117_N, 118 shown in FIG. 1 are omitted in FIG. 9. A skilled person should readily appreciate that certain connections required by the PCIe switch 102 can be provided by one or some of the multiplexers 111, 117_1-117_N, 118. The major difference between the computer system 600 shown in FIG. 6 and the computer 700 shown in FIG. 9 is that the SoC-side port P42 of the physical lane switch 606 (which is an external device of the SoC 100) is coupled to the PHY circuit 108 of the SoC 100. After the computer system 700 is successfully powered on through a boot sequence, the computer system 700 enters a normal operation stage, and has a configuration identical to that illustrated in FIG. 7. Similar description is omitted here for brevity.

Figure 10:
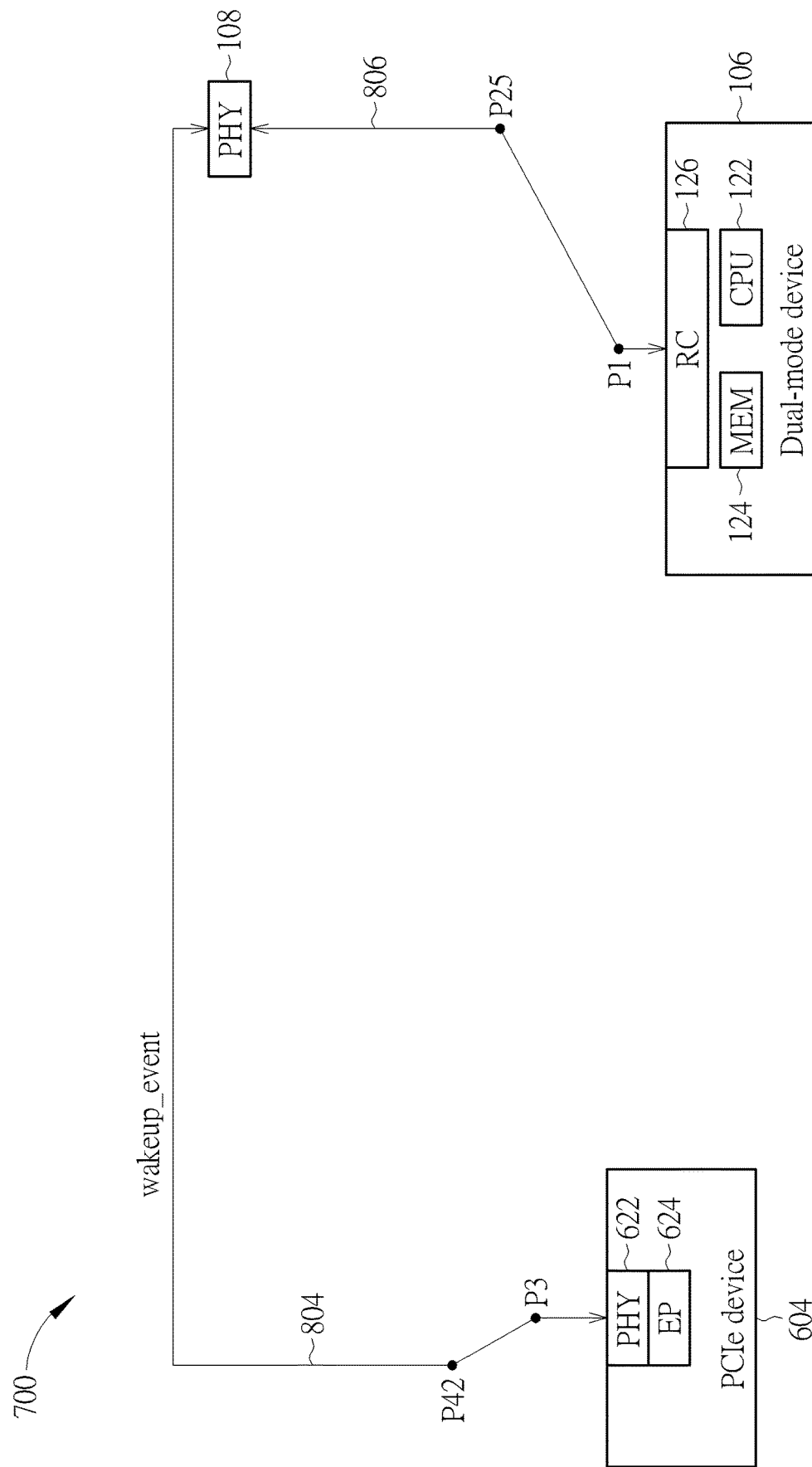
FIG. 10 is a diagram illustrating a configuration of the third computer system in a power saving stage according to an embodiment the present invention.

When the computer system 700 enters a power saving stage (e.g., sleep mode), it has a configuration different from that illustrated in FIG. 8. Please refer to FIG. 9 in conjunction with FIG. 10. FIG. 10 is a diagram illustrating a configuration of the computer system 700 in a power saving stage according to an embodiment the present invention. For certain applications, the computer system 700 may leave the normal operation stage and then enter the power saving stage (e.g., sleep mode) for reducing the system power consumption. During the power saving stage, the PCIe host 602 is arranged to enter a power saving mode (e.g. power off mode), that is, may have no capability of handling/controlling the device, the dual-mode device 106 is arranged to operate under the RC mode for acting as a secondary PCIe host (which is an on-chip PCIe host), the multiplexer 104 is instructed by the control signal SEL to enable another connection path 806 for coupling the dual-mode device 106 to the PHY circuit 108, and the physical lane switch 606 is instructed by the control signal SEL_1 to enable another connection path 804 for coupling the PCIe device 604 to the PHY circuit 108. More specifically, the multiplexer 104 couples the device-side port P1 to the switch-side port P25, and the physical lane switch 606 enables internal interconnection between the device-side port P3 and the SoC-side port P42. Hence, the secondary PCIe host (i.e. dual-mode device 106 operating under the RC mode) can fully control the PCIe device 604 (which is external to the SoC 100) through communicating with the PCIe device 604 via at least the connection path 804, the PHY circuit 108, and the connection path 806. In other words, the low-power secondary PCIe host (i.e. dual-mode device 106 operating under the RC mode) can process the device data from the PCIe device 604. In this way, the low-power secondary PCIe host (i.e. dual-mode device 106 operating under the RC mode) can handle a system wakeup event wakeup_event triggered by the PCIe device 604. For example, the PCIe device 604 may be an input device such as a mouse, a keyboard, or a joystick. In response to the system wakeup event wakeup_event from the PCIe device 604, the computer system 700 may leave the power saving stage (e.g., sleep mode) and then enter the normal operation stage again.

To achieve more system power consumption reduction during the power saving stage, some or all of the unused components of the PCIe switch 102 may be controlled to enter a power saving mode (e.g. power off mode), that is, may have no capability of handling/controlling the device. For example, all of the UP 112, the DPs 114_1-114_N, 116, the multiplexers 111, 117_1-117_N, 118, and the PHY circuits 115_1-115_N, 113 may be turned off, that is, may have no capability of handling/controlling the device.

In the aforementioned embodiments, the SoC 100 has the dual-mode device 106 that supports an RC mode and an EP mode and is capable of dynamically switching between the RC mode and the EP mode in response to different system stages. The function of switching between the RC mode and the EP mode is achieved by configuring a single controller (i.e. dual-mode controller 126) in the dual-mode device 106. However, this is for illustrative purposes only, and is not meant to be a limitation of the present invention. Alternatively, the function of switching between the RC mode and the EP mode may be achieved by activating one controller selected from two individual controllers, including an EP controller and an RC controller implemented in a dual-mode device.

Figure 11:
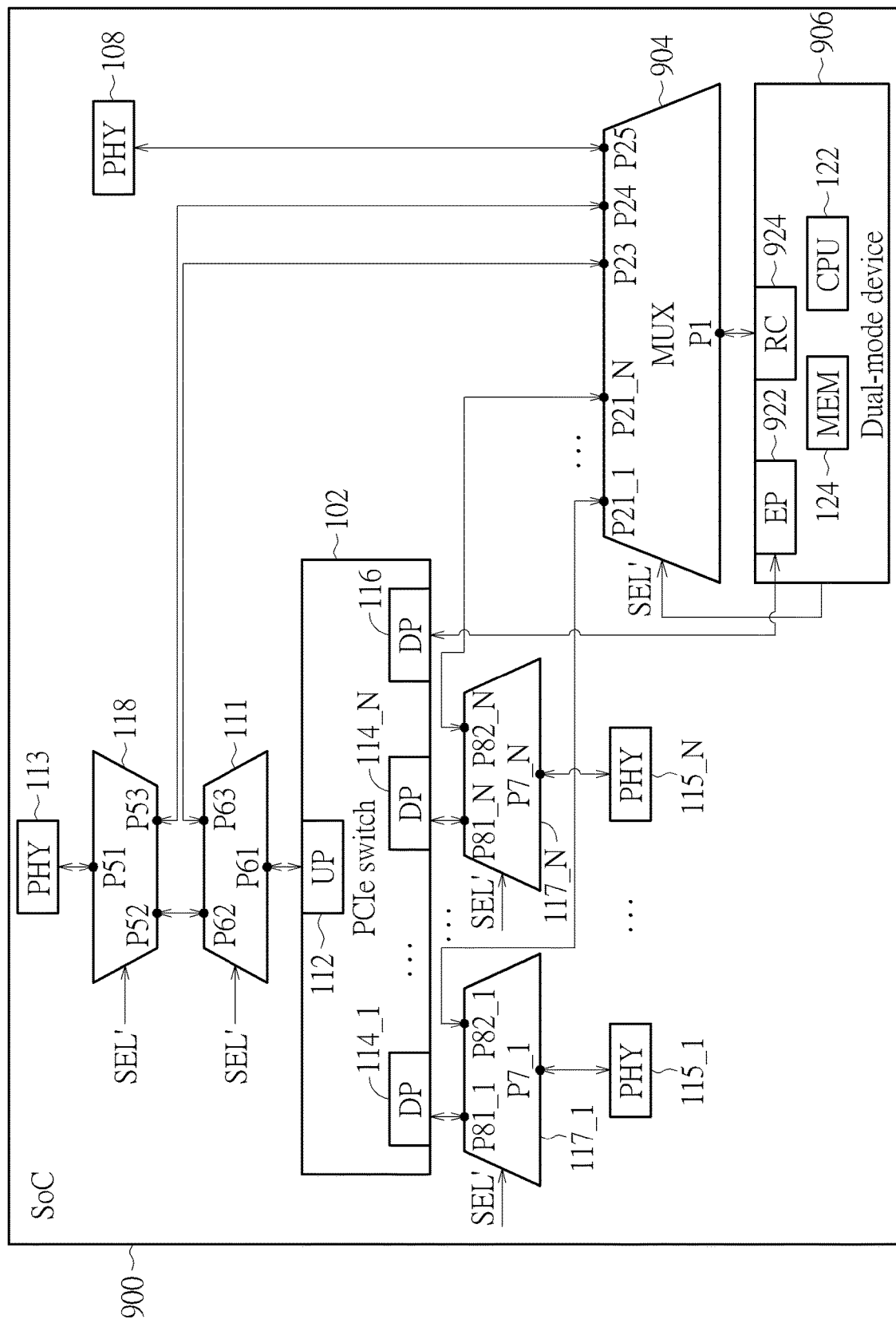
FIG. 11 is a diagram illustrating another SoC that supports a PCIe power saving feature according to an embodiment of the present invention.

FIG. 11 is a diagram illustrating another SoC that supports a PCIe power saving feature according to an embodiment of the present invention. The SoC 900 includes the PCIe switch 102 and the PHY circuit 108, and further includes a multiplexer (MUX) 904 and a dual-mode device 906. Each of the multiplexers 904, 111, 117_1-117_N, and 118 may be regarded as a signal transmission control circuit for controlling signal transmission and/or signal conversion. The major difference between the dual-mode devices 106 and 906 is that the dual-mode device 906 has two individual controllers, including an EP controller (labeled by "EP") 922 and an RC controller (labeled by "RC") 924. The major difference between the multiplexers 104 and 904 is that the switch-side port P22 is omitted from the multiplexer 904, and the device-side port P1 is coupled to the RC controller 924 of the dual-mode device 906. As shown in FIG. 11, the EP controller 922 is coupled to the DP 166 of the PCIe switch 102 without via the multiplexer 904. Hence, when the dual-mode device 906 operates in an EP mode due to a system stage being a normal operation stage, one connection path between the EP controller 922 and the DP 116 is available in the SoC 900, without being enabled by means of the multiplexer 904. Furthermore, since the dual-mode device 906 and the PCIe switch 102 are both internal components of the same chip, the DP 116 is allowed to be coupled to the EP controller 922 without via any PCIe PHY circuit, and the RC controller 924 is allowed to be coupled to the device-side port P1 without via any PCIe PHY circuit. However, this is for illustrative purposes only, and is not meant to be a limitation of the present invention. Alternatively, a PCIe PHY circuit may be equipped between the DP 116 and the EP controller 922.

Like the aforementioned dual-mode device 106, the dual-mode device 906 supports an RC mode and an EP mode, and is arranged to dynamically switch between the RC mode and the EP mode, depending upon different system stages such as a normal operation stage (e.g. normal mode) or a power saving stage (e.g. sleep mode). For example, the dual-mode device 906 activates the EP controller 922 and deactivates the RC controller 924 when a computer system (which uses the SoC 900) enters the normal operation stage, and deactivates the EP controller 922 and activates the RC controller 924 when the computer system (which uses the SoC 900) leaves the normal operation stage and enters the power saving stage. In other words, the EP controller 922 is workable in the normal operation stage, and the RC controller 924 is workable in the power saving stage. With proper control of the EP controller 922 and the RC controller 924, the same objective of enabling a dual-mode device to dynamically switch between an RC mode and an EP mode is achieved.

By way of example, but not limitation, the dual-mode device 906 (particularly, CPU subsystem 122 of dual-mode device 906) may generate a control signal SEL' to the multiplexer 904 to control internal interconnection between the device-side port P1 and the switch-side ports P21_1-P21_N, P23, P24, P25, and may further use the control signal SEL' to control internal interconnection of the multiplexers 111, 117_1-117_N, 118. In this embodiment, the DP 116 of the PCIe switch 102 is coupled to the EP controller 922 of the dual-mode device 906. Unlike the aforementioned multiplexer 104, the multiplexer 904 is arranged to disconnect the device-side port P1 from any of the switch-side ports P21_1-P21_N, P23, P24, P25 when the dual-mode device 906 enters the EP mode. Like the aforementioned multiplexer 104, the multiplexer 904 has switch-side ports P21_1-P21_N, P23, P24, P25 coupled to PHY circuits 115_1-115_N, UP 112, and PHY circuits 113, 108, respectively. Hence, the multiplexer 904 is arranged to couple the device-side port P1 to one of the switch-side ports P21_1-P21_N, P23, P24, P25 when the dual-mode device 906 enters the RC mode.

In some alternative designs of the present invention, each of the computer systems 200, 600, 700 may be modified to have the SoC 100 replaced with the SoC 900. The same objective of using an RC controller of a dual-mode device in one SoC to handle a system wakeup event triggered by an external PCIe device when a computer system operates in a power saving stage can be achieved. Since a person skilled in the art can readily understand details of these alternative designs after reading above paragraphs directed to the configurations shown in FIGS. 4, 5, 8, and 10, similar description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
a chip, comprising:
a peripheral component interconnect express (PCIe) switch;
a dual-mode device, arranged to switch between a root complex (RC) mode and an endpoint (EP) mode; and
a signal transmission control circuit; and
a PCIe upstream component, external to the chip and coupled to the PCIe switch;
wherein during a normal operation stage of the computer system, the PCIe upstream component is arranged to act as a system primary host, and the dual-mode device is arranged to operate under the EP mode, and is coupled to the PCIe switch via one connection path; and during a power saving stage of the computer system, the PCIe upstream component is arranged to enter a power saving mode, the dual-mode device is arranged to operate under the RC mode to act as a system secondary host, and the signal transmission control circuit is arranged to enable another connection path for coupling the dual-mode device to the PCIe switch.

2. The computer system of claim 1, wherein during the normal operation stage of the computer system, the signal transmission control circuit is further arranged to enable said one connection path for coupling the dual-mode device to the PCIe switch.

3. The computer system of claim 1, further comprising:
a PCIe device, external to the chip;
wherein the PCIe switch comprises:
a downstream port; and
a first physical layer (PHY) circuit, wherein during the normal operation stage of the computer system, the downstream port is coupled to the first PHY circuit, and the downstream port is arranged to communicate with the PCIe device via at least the first PHY circuit; and during the power saving stage of the computer system, the dual-mode device is arranged to communicate with the PCIe device via at least the first PHY circuit and said another connection path.

4. The computer system of claim 3, wherein during the power saving stage of the computer system, the downstream port is arranged to enter a power saving mode.

5. The computer system of claim 3, wherein the PCIe switch further comprises:
an upstream port; and
a second PHY circuit, wherein during the normal operation stage of the computer system, the upstream port is coupled to the second PHY circuit, and the upstream port is arranged to communicate with the PCIe upstream component via at least the second PHY circuit; and during the power saving stage of the computer system, the dual-mode device is arranged to communicate with the PCIe device via at least the first PHY circuit, the downstream port, the upstream port, and said another connection path.

6. The computer system of claim 5, wherein during the power saving stage of the computer system, the second PHY circuit is arranged to enter a power saving mode.

7. The computer system of claim 1, further comprising:
a PCIe device, external to the chip; and
an external device, external to the chip;
wherein the PCIe switch comprises:
a downstream port;
a first physical layer (PHY) circuit; and
a second PHY circuit;
wherein during the normal operation stage of the computer system, the external device is arranged to couple the PCIe device to the first PHY circuit, the first PHY circuit is coupled to the downstream port, and the downstream port is arranged to communicate with the PCIe device via at least the first PHY circuit and the external device; and during the power saving stage of the computer system, the external device is arranged to couple the PCIe device to the second PHY circuit, and the dual-mode device is arranged to communicate with the PCIe device via at least the external device, the second PHY circuit, and said another connection path.

8. The computer system of claim 7, wherein during the power saving stage of the computer system, the first PHY circuit and the downstream port are both arranged to enter a power saving mode.

9. The computer system of claim 1, further comprising:
a PCIe device, external to the chip; and
an external device, external to the chip;
wherein the PCIe switch comprises:
a downstream port; and
a first physical layer (PHY) circuit;
wherein the chip further comprises:
a second PHY circuit;
wherein during the normal operation stage of the computer system, the external device is arranged to couple the PCIe device to the first PHY circuit, the first PHY circuit is coupled to the downstream port, and the downstream port is arranged to communicate with the PCIe device via at least the first PHY circuit and the external device; and during the power saving stage of the computer system, the external device is arranged to couple the PCIe device to the second PHY circuit, and the dual-mode device is arranged to communicate with the PCIe device via at least the external device, the second PHY circuit, and said another connection path.

* * * * *